United States Patent [19]

Mazzoni

[11] 4,394,902

[45] Jul. 26, 1983

[54] OFFSET DEVICE FOR ARRANGING ALONG TWO PARALLEL LINES, ARTICLES WHICH ARRIVE FROM A SINGLE LINE

[75] Inventor: Guido Mazzoni, Busto Arsizio, Italy

[73] Assignee: Costruzioni Meccaniche G. Mazzoni S.p.A., Busto Arsizio, Italy

[21] Appl. No.: 267,295

[22] Filed: May 26, 1981

[30] Foreign Application Priority Data

Jun. 6, 1980 [IT] Italy ............................ 22626 A/80

[51] Int. Cl.³ ............................................ B65G 47/26

[52] U.S. Cl. .................................... 198/436; 198/438

[58] Field of Search ............... 198/426, 427, 429, 436, 198/438, 448, 419, 420, 456, 736

[56] References Cited

U.S. PATENT DOCUMENTS 2,630,951 3/1953 Slightam ............................ 198/736
3,225,891 12/1965 Hickin ................................ 198/429
4,265,355 5/1981 Davis .................................. 198/427

FOREIGN PATENT DOCUMENTS 352007 8/1979 Austria .
93969 5/1969 France .
2180489 3/1973 France .
2430832 10/1978 France .
2023057 8/1979 United Kingdom .

*Primary Examiner*—Joseph E. Valenza
*Assistant Examiner*—Jonathan D. Holmes
*Attorney, Agent, or Firm*—Young & Thompson

[57] ABSTRACT

In a feed line of articles arranged one after the other on a movable conveyor belt or the like so as to make up a continuous row, the articles being under the control of a longitudinal guide device, a stop member is provided for blocking this row of articles at the cavity of the molding box into which one article is to be introduced by a pusher. A drawing member is provided for another article in the row, the drawing member being reciprocated in a direction at right angles to the row of articles, so as to form a second row guided by second guide devices. A second stop member is provided for the second row, and a second pusher is provided for introducing the individual articles of the second row into a second cavity of the molding box in which such articles are received.

5 Claims, 12 Drawing Figures

FIG. 3
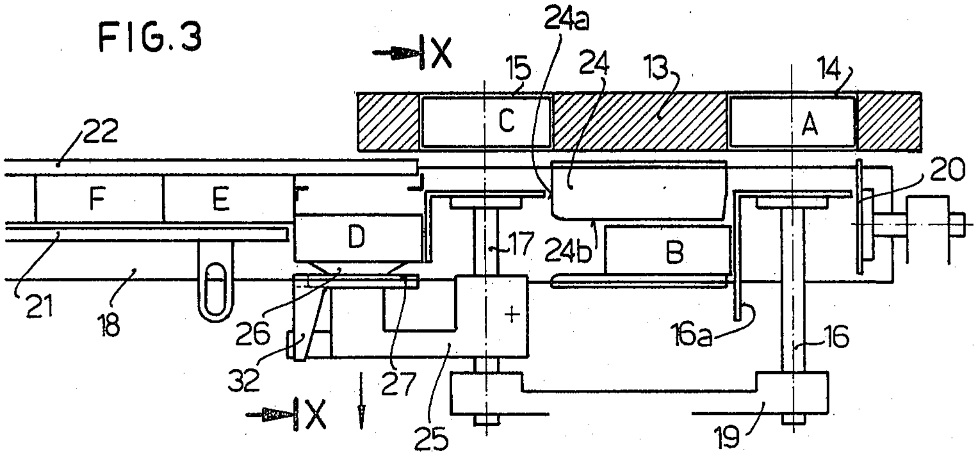
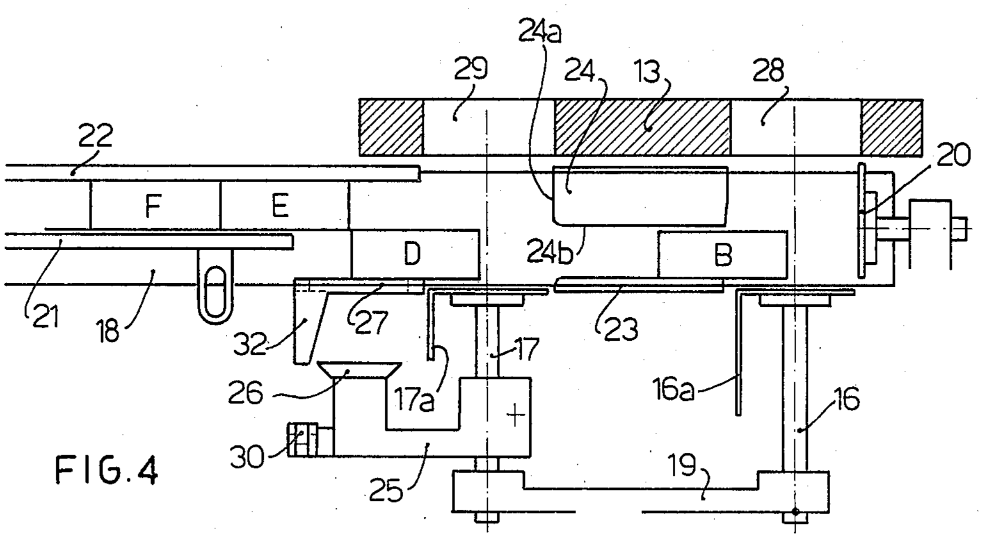
FIG. 4

OFFSET DEVICE FOR ARRANGING ALONG TWO PARALLEL LINES, ARTICLES WHICH ARRIVE FROM A SINGLE LINE

This invention relates to an offset device for arranging along two parallel lines articles moving along a single line, so as to feed for example a DUPLO or QUATER type of soap molding machine which have been described in the German Patent Specification No. 501,873 of July 9, 1930, issued to R. A. JONES & Company Incorporated of Covington, Ky., U.S.A., and in the Italian Patent Specification No. 770,188 of May 23, 1964 and additions issued to Costruzioni Meccaniche G. Mazzoni S.p.A. of Busto Arsizio (Varese).

A DUPLO type of molding machine is a machine for simultaneously treating two soap blanks during each molding operation, whereas a QUATER type of molding machine is instead a machine for simultaneously treating four soap blanks during each molding operation.

At present, in the DUPLO type of machines, the soap blanks are fed into the two cavities provided in the molding box by means of two parallel conveyor belts located at the two sides of said molding box, so that the soap blank placed on the righthand conveyor belt is pushed into one of said cavities, while the other soap blanks placed on the second belt is pushed into the second cavity. In order to arrange such soap blanks on two parallel conveyor belts, use is made of a deflector located upstream of said conveyor belts. Such deflector comprises a reciprocating vape.

In the QUATER type of machines the feed is still provided at the two sides of the molding box with soap blanks having a larger size than the double of each individual mold, so that during the pushing operation of each blank into the cavities for molding, provision is also made for dividing and trimming the soap blanks through the use of special die cuts.

Thus, there is also the disadvantage of a larger amount of scraps which are recycled, this substantially reducing the output or production of the soap extruder.

It is the primary object of the present invention to feed separately two articles, for instance soap blanks at only one side of the molding box. Therefore, in a DUPLO type of machine use will be made of only one conveyor belt or the like located sidewise of said box, which directly connects the production line to the molding line.

On the other hand, in a QUATER type of machine use will be made of two conveyor belts and two devices according to the invention.

In a DUPLO type of molding machine a high constructive and operating simplification is provided. In a QUATER type of molding machine an increase in efficiency is also provided as due to the decrease in scrap recirculation.

The above specified object has been achieved by providing, in a feed of articles arranged one after the other on a movable conveyor belt or the like, so as to make up a continuous row under the control of a longitudinal guide device, a stop member blocking the leading article of this row in front of the cavity into which said leading article has to be introduced, and a pusher for introducting said leading article into said cavity of the molding box; the fse of a drawing member which by means of its reciprocating motion at right angles to said first row of articles provides for shifting preselected articles from said first row to a second row parallel to said first row, a second guide device and a second stop member for said second row, and finally a second pushing means which introduces the leading article of said second row into the cavity suitable to receive the same.

It is contemplated in a preferred embodiment of the invention that said article drawing member comprises a sucker.

A further improvement in or relating to the invention is obtained by providing that said two pushers and drawing member effect a common reciprocating motion, being these members integral with one another.

Still another improvement in or relating to the invention provides that said pushers and drawing member are slidably mounted with respect to one another longitudinally of the rows of articles, so that the latter can be shifted to this longitudinal direction to accomodate the various sizes of the articles to be molded.

A further improvement in or relating to the invention provides that the articles handling by means of said drawing member and pushers is achieved using the driving motion of the molding machine.

The invention will now be described in further detail with reference to some exemplary embodiments which have been shown in the figures of the accompanying drawings, in which:

FIG. 3 is a view similar to that of FIG. 1, but showing the step of half return stroke of the pushers;

FIG. 4 is a view similar to that of FIG. 1, but showing the step of nearly end of return stroke of the pushers;

Figure 1:
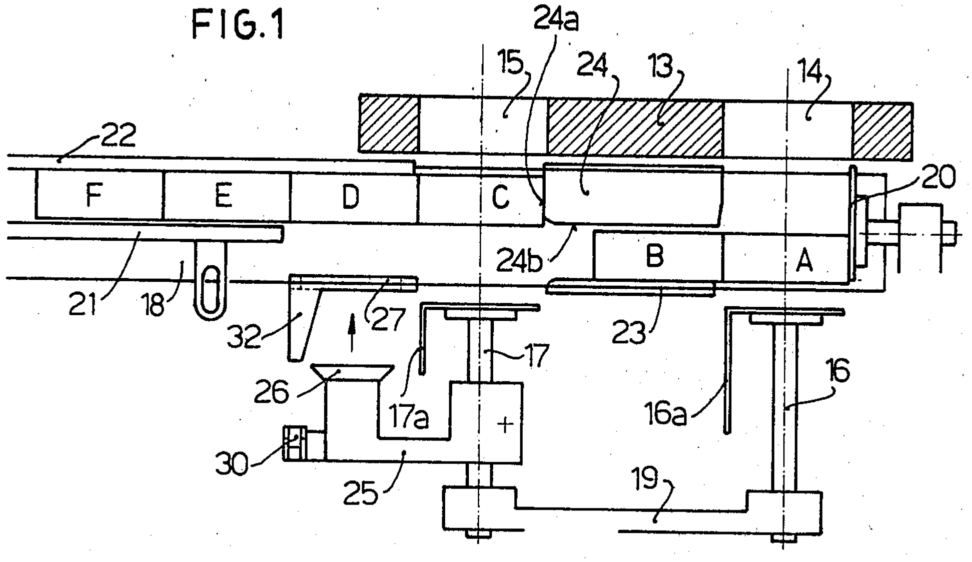
FIG. 1 is a plan view with the molding box cut-away at the loading cavities of a feeding device for a DUPLO type of machine at the starting step of the forward stroke of the pushers.

Referring to FIG. 1, the molding box 13 cut-away at the loading cavities shows the two cavities 14 and 15, into which the soap blanks A and C have to be pushed by the pushers 16 and 17, said soap blanks being carried at said cavities 14 and 15 by the conveyor belt 18 which is intermittently forwardly moved in timing relationship with the movement of said pushers 16 and 17.

Said pushers 16 and 17 are reciprocated near to and away from said box 13, the reciprocating motion being provided by a support or bearing 19 connected to a suitable slide.

The conveyor belt 18 starts to move towards the stop member 20 as the pushers 16 and 17 are moving away from said box 13, and is at a standstill when said pushers 16 and 17 are approaching said box 13.

Said conveyor belt 18 is provided with guides 21, 22, 23 and 27 performing the function of maintaining both the first and second row of soap blanks carried by the conveyor belt 18 at the correct orientation.

A parallelepiped block 24 is also provided performing the dual function of:

(a) forming with its portion perpendicular to the movement of the soap blanks a first stop member for the blanks making up the first row, so that the leading blank of said row can be pushed by the pusher 17 into said cavity 15;

(b) creating by means of its wall 24*b* parallel to the row of blanks with said guide 23 a guide channel for the correct positioning of the second row of blanks, which comes to stop against the second stop member comprising said stop 20, whereby this second row of blanks will be positioned so that its leading blank can be pushed by said pusher 16 into the cavity 14 of said molding box 13.

The pushers 16 and 17 are both provided with a wall 16*a* and 17*a* respectively, arranged at right angles to the blank motion, such walls preventing the blanks from being advanced during the movement of said pushers.

A support or bearing 25 is connected with said pusher 17 and carries a sucker 26 acting as a drawing member for a soap blank from the first row. By passing through a hole provided in said guide 27, this sucker 26 will approach in its forward stroke the soap blanks aligned along the first row on said conveyor belt 18.

In the figures of the accompanying drawings the reference letters A, B, C, D, E and F designate the soap blanks carried by the conveyor belt 18. The blanks C and E will form the first row, blanks B, D and F will form the second row of blanks parallel to said first row.

In FIG. 1 the soap blanks A and C are already aligned at the respective cavities 14 and 15, as positioned by the stop members 20 and 24. The conveyor belt 18 is terminating its forward stroke.

Figure 2:
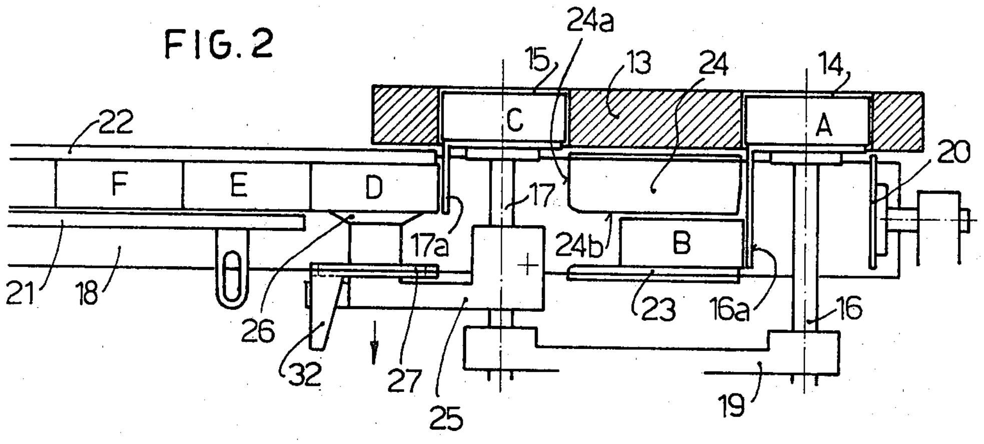
FIG. 2 is a view similar to that of FIG. 1, but showing the device at the step of end of stroke of the pushers.

In FIG. 2 the soap blanks A and C have been pushed by the pushers 16 and 17 into the cavities 14 and 15 of the molding box 13 and at the same time said sucker 26 has passed through the hole of guide 27 and has been moved close to the soap blanks D. The conveyor belt 18 has completed its forward stroke.

In FIG. 3 the soap blanks A and C remain in cavities 14 and 15 of the molding box 13 which, by rotating through 90°, will move said soap blanks A and C to the next molding station, not shown in the drawing V The pushers 16 and 17 start the return stroke moving away from said molding box 13 and at the same time said sucker 26 (connected to said pusher 17 by said support or bearing 25 and suitably connected to a vacuum circuit) will draw along the soap blank D, displacing it laterally of the line of the soap blanks carried by the conveyor belt 18, the latter starting a new forward stroke.

In FIG. 4 the soap blank D has terminated the lateral movement or displacement, as carried by said feeding sucker 26. As soon as said soap blank D bears on guide 27 a roller valve 30, shown in FIG. 6, switches the connection of the sucker for the vacuum circuit to the atmosphere, so that said soap blank D is now free to follow the movement of the conveyor belt 18. Therefore, the soap blanks B and D are moved on by the forward stroke of the conveyor belt 18. At the same time, after having rotated through 90°, the molding box 13 brings two new cavities 28 and 29 in front of the pushers 16 and 17.

Figure 5:
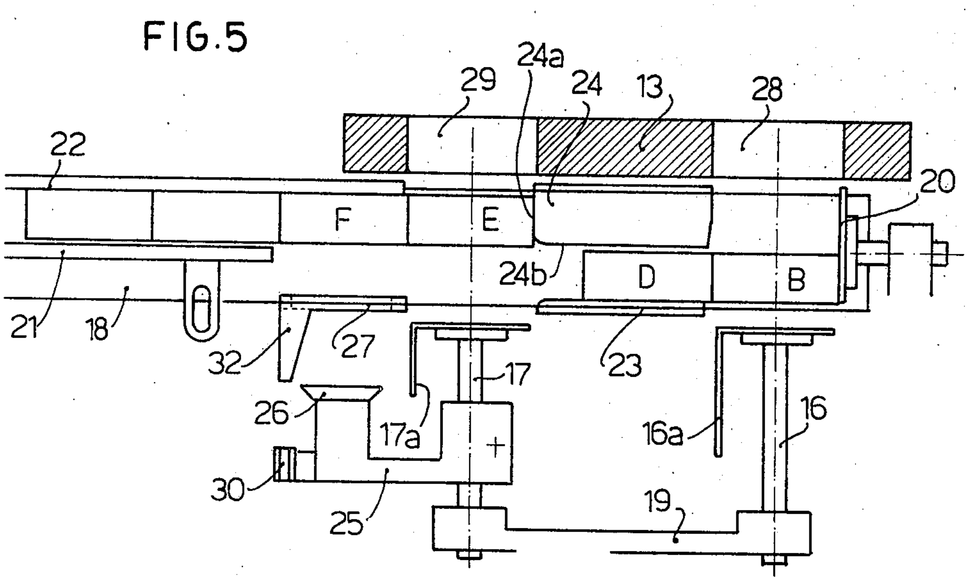
FIG. 5 is a view similar to that of FIG. 1, with the device arranged at the starting step of a new cycle of movement of the pushers, at which the soap blanks are now displaced with respect to FIG. 1.

In FIG. 5 the soap blanks B and D have terminated the forward stroke towards the stop member 20 as carried by the conveyor belt 18, and the soap blanks E has stopped against the wall 24*a* of block 24, the latter acting as a stop member for the first row.

Then, the pushers 16 and 17 start a new stroke of approachment to the molding box 13 with the purpose of introducing the soap blanks B and E into the cavities 28 and 29 of said molding box 13, repeating the operations as described in FIG. 1 for the soap blanks A and C.

Figure 6:
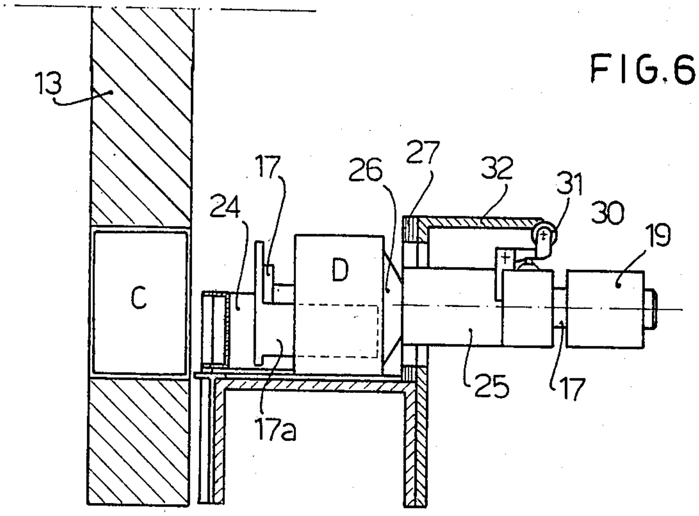
FIG. 6 is a cross-sectional view taken along line X—X of FIG. 3.

In an enlarged detailed sectional view FIG. 6 shows the sucker device 26 provided with the roller valve 30 connected to the vacuum circuit (not shown in figure). When the roller 31 of valve 30 is pressed in the forward stroke by the tab 32 attached to the upper portion of guide 27, the vacuum circuit is connected with the sucker 26. Thereby, said sucker 26 is allowed to draw the soap blank D and laterally displaces it, as above described. When in the reverse stroke said roller 31 is no longer pressed by said tab 32, the connection of the vacuum circuit to the sucker is cut off, and as a result the soap blank bearing on guide 27 is released.

The successive FIGS. 7 to 12 show the various transfer steps for the soap blanks in a QUATER type of molding machine, that is a machine capable of simultaneously treating four soap blanks during each molding cycle.

With reference to FIGS. 7 to 12, reference numeral 33 designates the molding box as cut-away at the loading cavities 34, 35, 36 and 37. The pushers 38 and 39, having side walls 38*a* and 39*a* at right angles to the rows of blanks, are connected to the support 42 and supply the soap blanks A and C into the cavities 34 and 36, while the pushers 40 and 41 with the walls 40*a* and 41*a* thereof arranged as the corresponding walls 38*a* and 39*a* are connected to the support 43 and supply the soap blanks A′ and C′ into the cavities 35 and 36. Each pair of pushers 38, 39 and 40, 41 are provided with a reciprocating motion, which is perpendicular to the rows of blanks and in opposite direction to each other.

The machine having four loading cavities is fed by two symmetric feeding devices of the above described type, which devices are arranged at either side of the molding box.

Particularly, the conveyor belt 44 moves the soap blanks located on the righthand side of the molding box 33, whereas the conveyor belt 45 moves the soap blanks located on the lefthand side of said molding box 33.

The soap blanks are stopped at the correct location by the stop members 46 and 47 and walls 48*a* and 49*a* of blocks 48 and 49, respectively, and are guided by the guides 50, 51, 52, 60 and 53, 54, 55 and 61.

The supports or bearings 56 and 57 are connected to the pushers 39 and 41, these supports or bearings carrying the feeding suckers 58 and 59 passing through the guides 60 and 61.

The suckers 58 and 59 are connected to the vacuum circuit by the roller valves 62 and 63.

Figure 7:
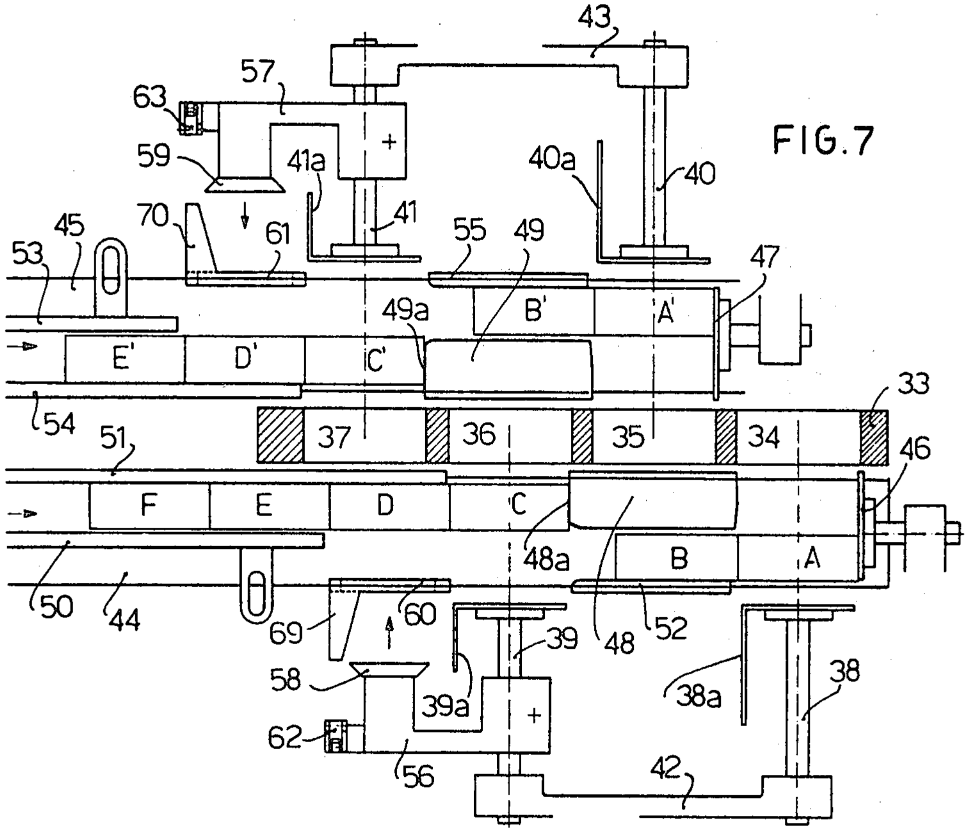
FIG. 7 is a view similar to that of FIG. 1, but showing a QUATER type of molding machine, that is a machine suitable to treat four soap blanks for each molding operation and is accordingly provided with two parallel feed conveyor belts, on each of which the same operations as provided for the DUPLO type of machine are carried out.

Referring to FIG. 7, the pushers 38 and 39 are shown ready to push the soap blanks A and C into the cavities 34 and 36 of the molding box 33. At the same time, at the opposite side of the molding box 33 the pushers 40 and 41 are ready to push the soap blanks A′ and C′ into the cavities 35 and 37 of said molding box 33. Thus, the soap blanks A, A', C and C' are simultaneously fed in a single step into the cavities 34, 35, 36 and 37. The soap blanks arrive on two parallel rows on the two conveyor belts 44 and 45, the latter being given an intermittent motion.

Figure 8:
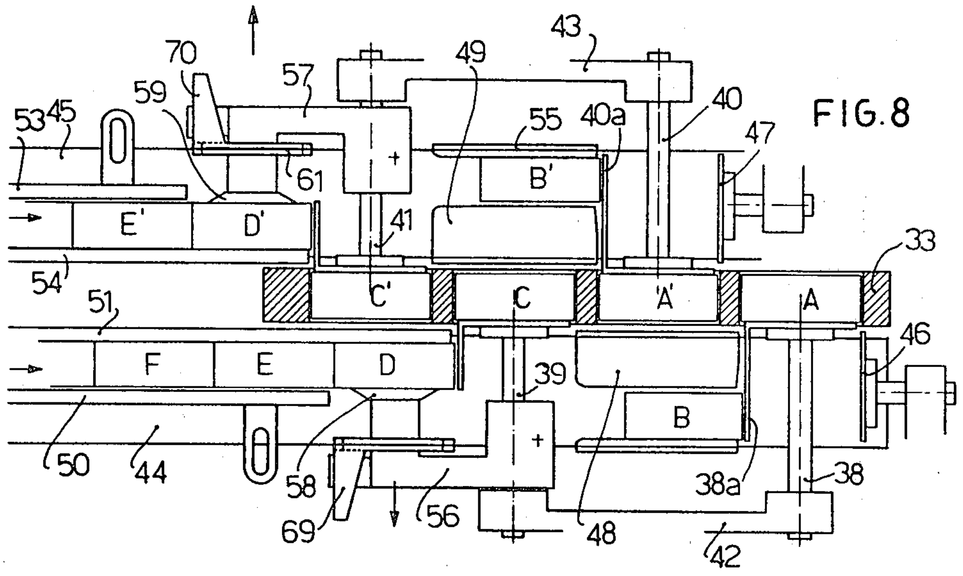
FIG. 8 is a view similar to that of FIG. 2, but adapted to a QUATER type of machine.

In FIG. 8 the arrival is shown of the soap blanks A, A', C and C' in the respective cavities 34, 35, 36 and 37, while the suckers 58 and 59 come to bear on the soap blanks D and D'.

Figure 9:
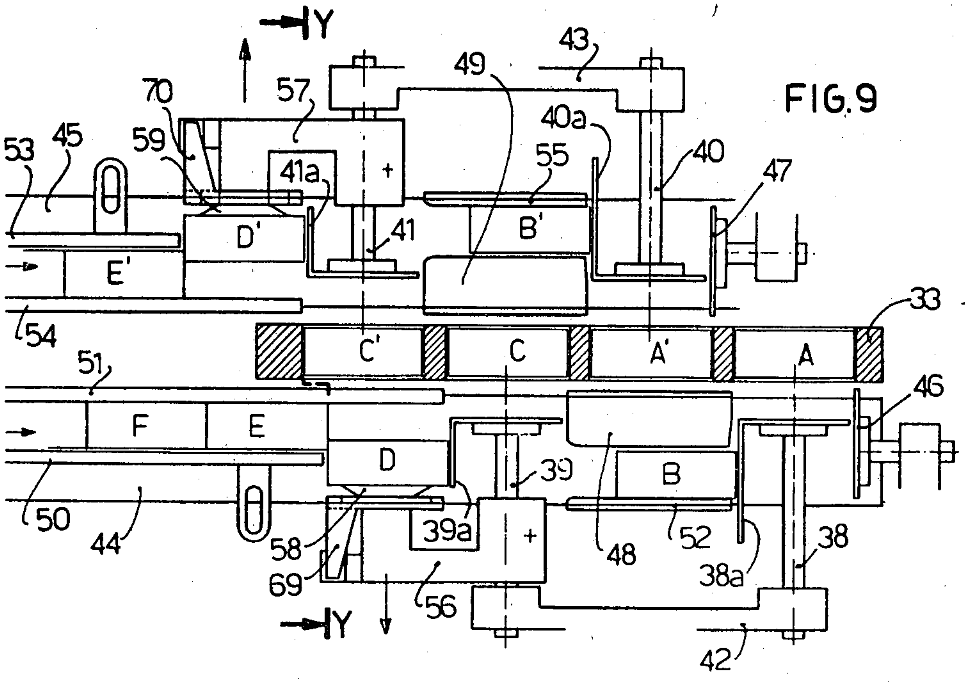
FIG. 9 is a view similar to that of FIG. 3, but adapted to a QUATER type of machine.

In FIG. 9 the return step of the pushers 38, 39, 40 and 41 is shown, while the suckers 58 and 59 connected to the vacuum circuit laterally displace the soap blanks D and D'.

Figure 10:
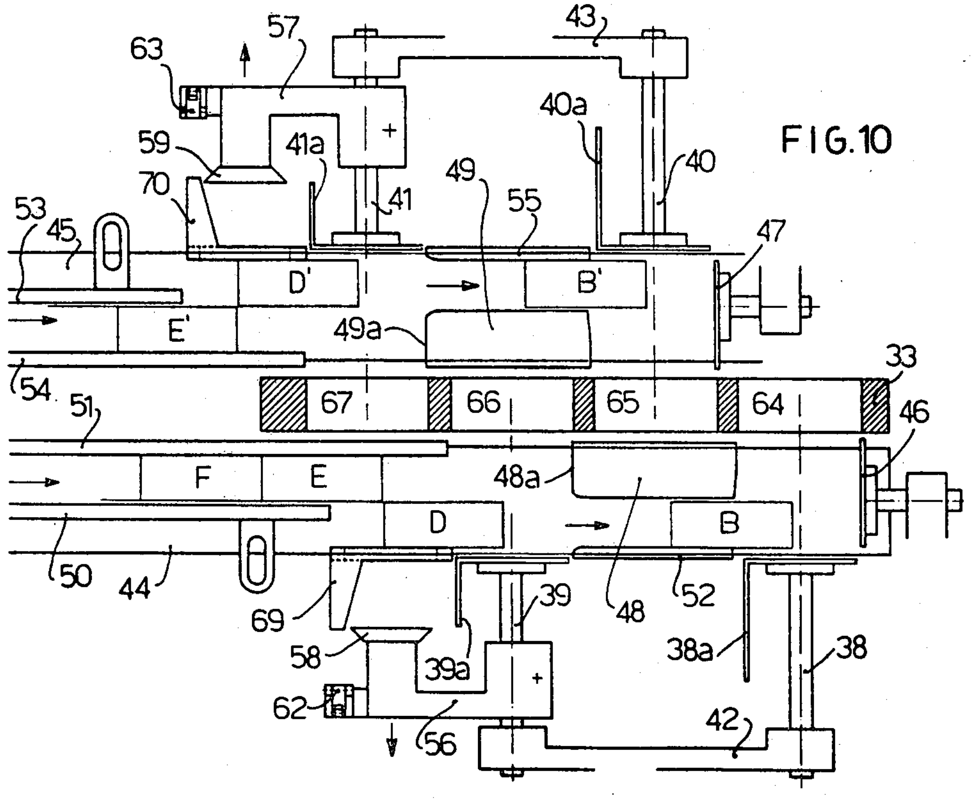
FIG. 10 is a view similar to that of FIG. 4, but adapted to a QUATER type of machine.

In FIG. 10 the molding box 33 has terminated the rotation through 90°, carrying the cavities 64, 65, 66 and 67 to the feed position, and the soap blanks D and D' have been shifted and released from the suckers 58 and 59 due to the interruption of the connection of the vacuum circuit. The soap blanks B, B', D and D' are carried by the conveyor belts 44 and 45 towards the stop members 46 and 47.

Figure 11:
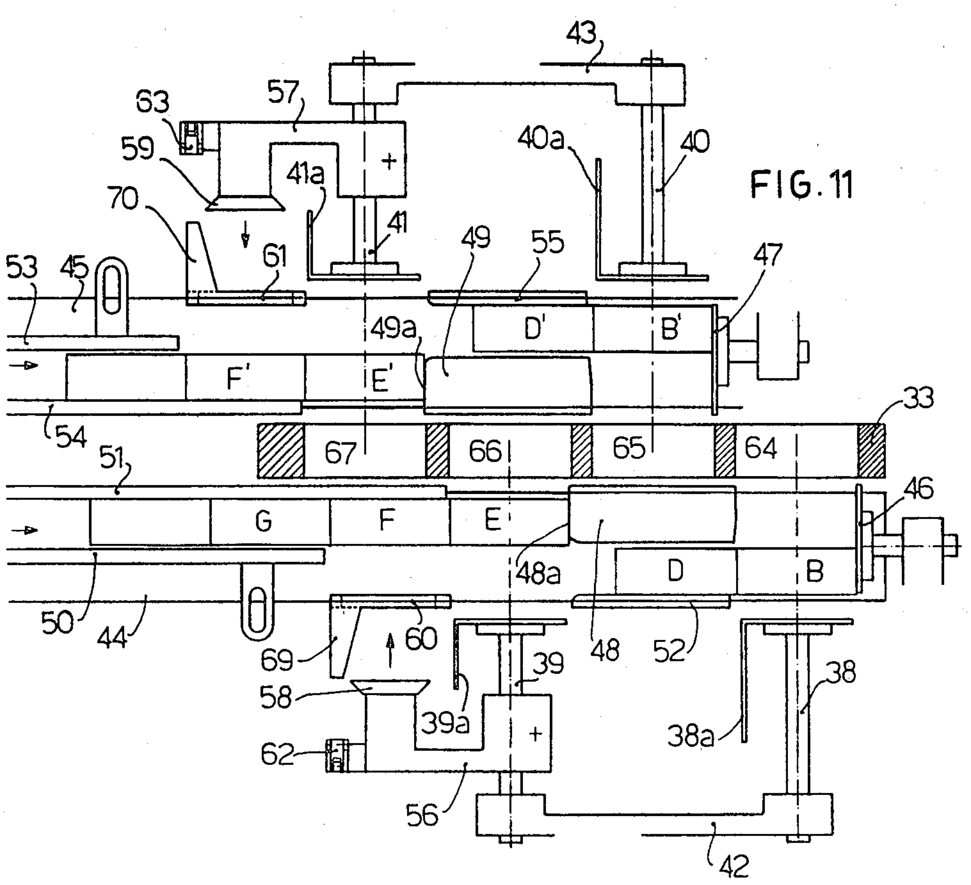
FIG. 11 is a view similar to that of FIG. 5, but adapted to a QUATER type of machine.

FIG. 11 shows the cycle start just as that indicated in FIG. 7. The soap blanks B, B' and E, E' are ready to be fed into the cavities 64, 65, 66 and 67.

Figure 12:
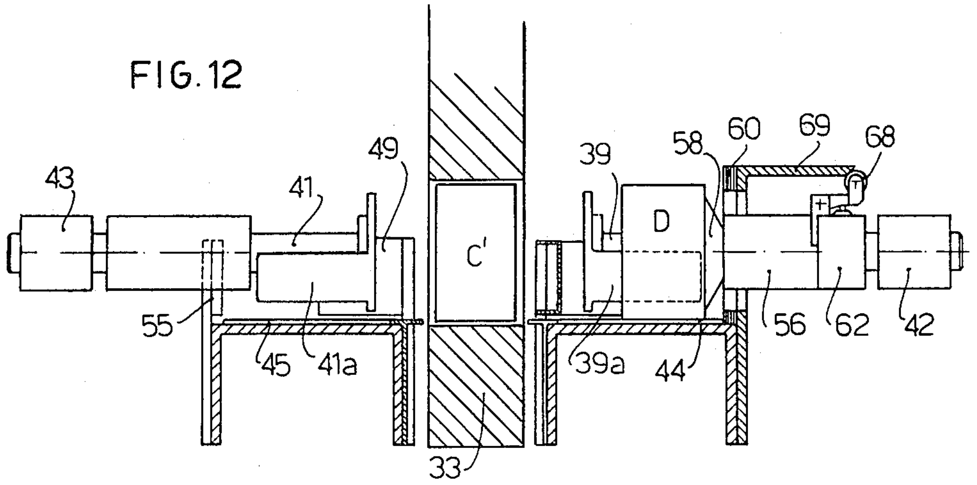
FIG. 12 is a cross-sectional view taken along line Y—Y of FIG. 9.

FIG. 12 shows a sectional view taken along line Y—Y of FIG. 9, showing the valve 62 with the roller 68 connecting the sucker 58 to the vacuum circuit under the control of tab 69.

The present invention comprises all those changes which may become evident to those skilled in the art. For example, the drawing members for the soap blanks could be also carried out by means of pliers gripping the soap blanks from the top, or by means of pusher members overrunning the soap blank in the forward stroke and displacing it at the second row in the rejurn stroke.

Moreover, the blocks forming both the stop members and guides could be shaped in a different manner than that shown, and particularly these two functions could be separately provided.

Also the guides schematically shown in the drawings could be made in many different ways.

What I claim is:

1. An offset device for arranging along two parallel lines articles which arrive from a single line, wherein a row of articles is arranged one after the other on a movable conveyor belt or the like so as to make up a continuous row subjected to a longitudinal guide device, a stop member for stopping the leading article in front of a cavity into which said article is to be introduced, pushing means for introducing said leading article into said cavity of the molding box, a drawing member mounted for reciprocating motion at right angles to said first row of articles to displace preselected articles from said first row to a second row parallel to the first row, a second guide device, a second stop member for the leading article of said second row and a second pushing means for introducing said leading article of said second row into a second cavity of the molding box capable of receiving the same.

2. A device according to claim 1, wherein said drawing member is a sucker.

3. A device according to claim 1, wherein said drawing member effects a reciprocating movement integral with the movement of the pushers.

4. A device according to claim 3, wherein said pushers and drawing member are slidably mounted with respect to one another, so that they can be displaced in a longitudinal direction relative to the rows of articles to accommodate different sizes of the articles.

5. A device according to claim 1, wherein the handling of the articles as carried out by the drawing member and pushers is provided by means of the driving motion of a molding machine of which they are part.

* * * * *